(12) United States Patent
Tabellini et al.

(10) Patent No.: US 8,297,197 B2
(45) Date of Patent: Oct. 30, 2012

(54) DEVICE FOR CONNECTING THE GANGWAY BELLOWS COVER AND THE CHASSIS OF ARTICULATED VEHICLES

(75) Inventors: Giorgio Tabellini, Sasso Marconi (IT); Luca Guidi, Bologna (IT)

(73) Assignee: P.E.I. Protezioni Elaborazioni Industriali S.R.L. (IT)

( * ) Notice: Subject to any disclaimer, the term of this patent is extended or adjusted under 35 U.S.C. 154(b) by 92 days.

(21) Appl. No.: 12/510,617

(22) Filed: Jul. 28, 2009

(65) Prior Publication Data
US 2010/0025960 A1 Feb. 4, 2010

(30) Foreign Application Priority Data

Jul. 31, 2008 (IT) .............................. BO2008A0488

(51) Int. Cl.
*B60D 5/00* (2006.01)
*B61D 17/22* (2006.01)
(52) U.S. Cl. ...................................................... 105/20
(58) Field of Classification Search .................. 105/8.1, 105/15, 18, 20; 160/395, 383, 392; 280/403; 296/166
See application file for complete search history.

(56) References Cited

U.S. PATENT DOCUMENTS

| | | | |
|---|---|---|---|
| 5,060,578 A | 10/1991 | Carimentrand | |
| 5,259,323 A | 11/1993 | Koch et al. | |
| 5,702,147 A * | 12/1997 | Essig | 296/106 |
| 5,884,565 A | 3/1999 | Koch | |

FOREIGN PATENT DOCUMENTS

| | | |
|---|---|---|
| DE | 14 00 854 | 1/1969 |
| DE | 199 47 268 | 10/2000 |
| EP | 548037 A1 * | 6/1993 |

OTHER PUBLICATIONS

European Search Report dated Oct. 7, 2009 from counterpart European patent application.
European Search Report dated Apr. 23, 2009 from counterpart Italian patent application.

* cited by examiner

*Primary Examiner* — S. Joseph Morano
*Assistant Examiner* — Zachary Kuhfuss
(74) *Attorney, Agent, or Firm* — Timothy J. Klima; Shuttleworth & Ingersoll, PLC

(57) ABSTRACT

A device for connecting the gangway bellows cover and the chassis of articulated vehicles includes a connecting element (2) having a hooking portion (3) which can be connected to an end edge (101a) of a gangway bellows cover (101), and an engagement portion (4) which can be inserted in a compartment (400) formed by a rigid support (300) belonging to the vehicle chassis and abutted to at least a first inner wall (310) of the compartment (400). The device also includes an elastically deformable insertion element (10) which is also positioned in the compartment (400) between the connecting element (2) and a second inner wall (320), so as to stably engage the engagement portion (4) against the first inner wall (310).

19 Claims, 3 Drawing Sheets

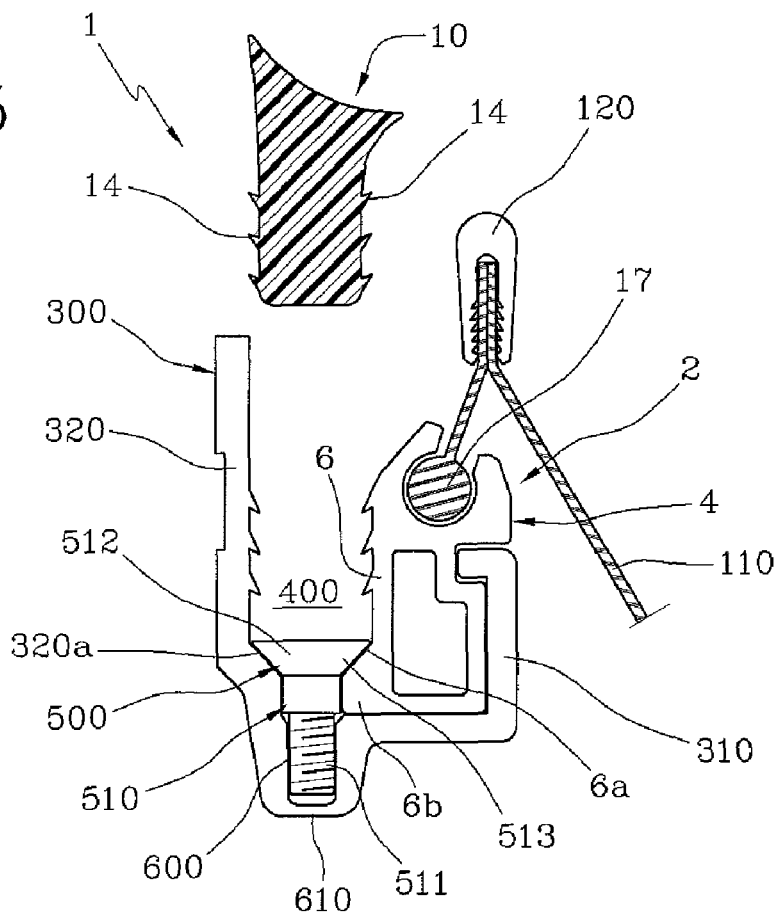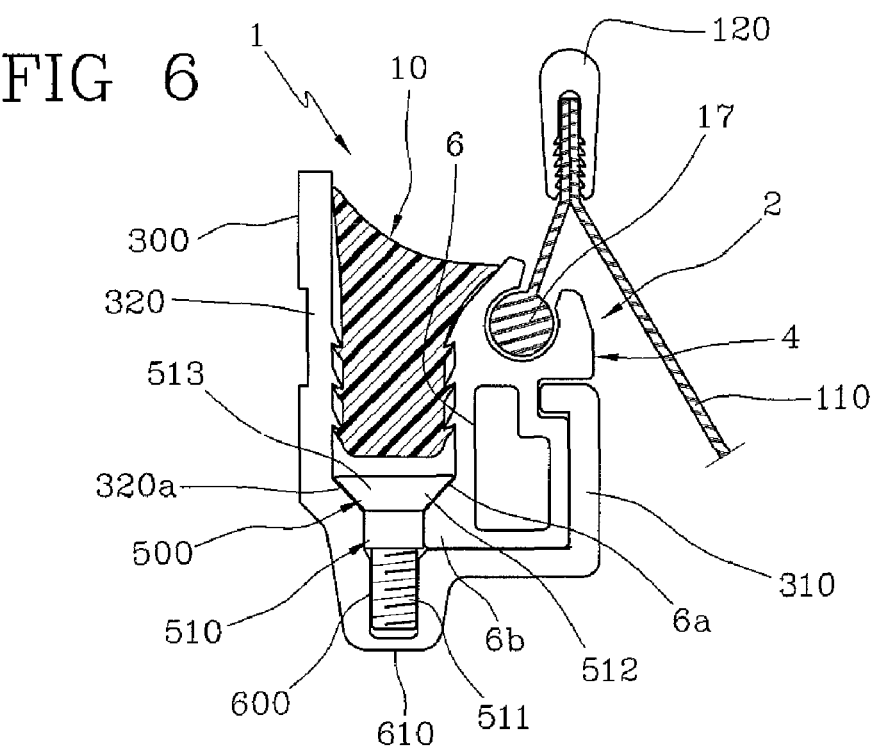

DEVICE FOR CONNECTING THE GANGWAY BELLOWS COVER AND THE CHASSIS OF ARTICULATED VEHICLES

This application claims priority to Italian Patent Application No. BO2008A000488, filed Jul. 31, 2008, which application is incorporated by reference herein.

BACKGROUND OF THE INVENTION

The present invention relates to a device for connecting the gangway bellows cover and the chassis of articulated vehicles, in particular for articulated vehicles such as buses.

In articulated or jointed vehicles, such as city buses, the connection between the two coaches of which the vehicle consists is made by means of rotary platforms able to allow both passenger transit and standing in the connecting zone.

The connection must, necessarily guarantee safety conditions even when the vehicle is cornering, that is to say, even when the two coaches are not aligned with each other.

There are prior art connecting devices consisting of a substantially inverted U-shaped gangway bellows cover whose ends are connected to the free ends of the two coaches, in such a way that the gangway bellows cover covers the rotary platform zone and deforms when the vehicle adopts configurations in which the two coaches are not aligned.

In particular, the gangway bellows cover-style connecting device has an accordion shape, that is to say, it has a plurality of U-shaped bands made of flexible material, usually plasticized fabric, which are joined together longitudinally.

There is also usually an additional inner gangway bellows cover, extending between a lateral wall of the gangway bellows cover and the rotary platform to provide improved protection for the joint between the lateral wall of the gangway bellows cover and the rotary platform.

The gangway bellows cover is stably fixed to the corresponding ends of the two coaches of the vehicle by means of suitably made connecting systems. These connecting systems comprise a metal section rigidly connected to the vehicle chassis and extending along the entire perimeter of the chassis.

Said section forms a compartment for housing a rubber seal designed to engage with an end edge of the gangway bellows cover.

In more detail, the end edge of the gangway bellows cover is connected by suitable connecting strips to a cable having a cross-section which is much greater than the cross-section of the gangway bellows cover. Said cable is inserted in a cavity in the seal, made between respective deformable tabs. In this way, the cable remains engaged inside the cavity, forming a stable connection between the gangway bellows cover and the seal.

There are also connecting undercuts between the seal and the housing compartment, for anchoring the seal to the metal section.

However, connecting systems of the type described above have significant disadvantages.

First, with the passage of time the seal may lose its elastic properties and therefore allow the cable to come out of the respective cavity, causing detachment of the gangway bellows cover from the chassis.

Moreover, the loss of seal elastic properties may result in damage to the connecting undercuts, with consequent detachment of the seal from the section.

In addition, damage to the seal may cause the formation of openings and cracks which may be infiltrated by water or other debris.

Finally, another disadvantage is the connecting strips joining the end edge and the cable, which do not guarantee a stable connection with the cable.

SUMMARY OF THE INVENTION

In this context, the technical purpose which forms the basis of the present invention is to propose a device for connecting the gangway bellows cover and the chassis of articulated vehicles which overcomes the above-mentioned disadvantages of the prior art.

In particular, the present invention has for an aim to provide a device for connecting the gangway bellows cover and the chassis of articulated vehicles which can increase the reliability of the connection between the gangway bellows cover and the chassis.

The present invention has for another aim to propose a device for connecting the gangway bellows cover and the chassis of articulated vehicles which is strong and durable with the passage of time.

The technical purpose indicated and the aims specified are substantially achieved by a device for connecting the gangway bellows cover and the chassis of articulated vehicles with the technical features described in one or more of the appended claims.

BRIEF DESCRIPTION OF THE DRAWINGS

Further features and advantages of the present invention are more apparent from the non-limiting description which follows of a preferred embodiment of a device for connecting the gangway bellows cover and the chassis of articulated vehicles, illustrated in the accompanying drawings, in which:

FIG. 5 is a plan view of another embodiment of the joint, in a respective assembly step; and FIG. 6 is a plan view of the joint of FIG. 5, in a respective operating step.

DESCRIPTION OF THE PREFERRED EMBODIMENTS

Figure 1:
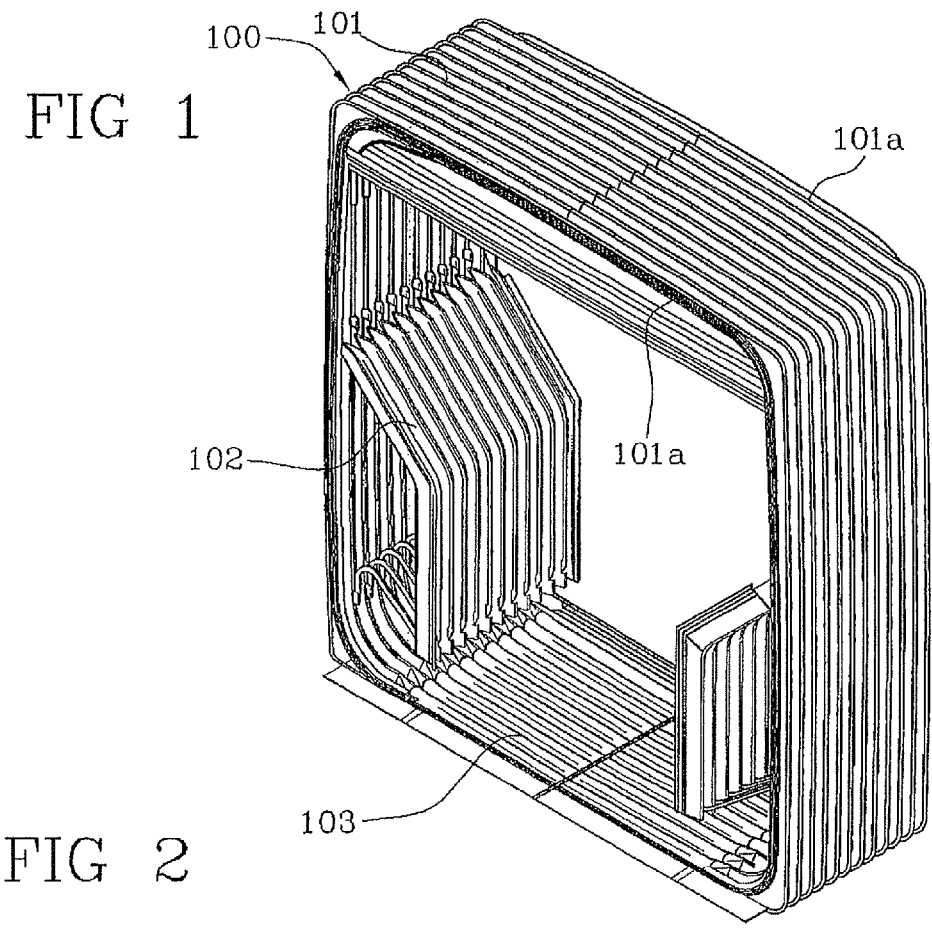
FIG. 1 is a perspective view of a gangway bellows cover for articulated vehicles, and in particular for articulated buses.

With reference to the accompanying drawings, the numeral 100 denotes as a whole a gangway bellows cover of an articulated vehicle which, preferably but not exclusively, may be an articulated bus. In articulated buses, the gangway bellows cover is in an intermediate position between the two coaches of the bus and in particular is positioned so that it covers the rotary platform which connects the two coaches.

In more detail, the gangway bellows cover 100 comprises an outer gangway bellows cover 101 having an inverted "U" shape and a pair of inner gangway bellows covers 102 located at vertical walls of the outer gangway bellows cover 101 to cover the lower joint zones between the outer gangway bellows cover 101 and a lower covering element 103 which covers the rotary platform.

Each gangway bellows cover 101, 102 comprises a plurality of bands 110 made of flexible material and equipped with stiffening frames 120.

Preferably, the bands 110 are made of plasticized fabric and the stiffening frames 120 are made of aluminum or of rigid plastic material.

The bands 110 are connected to each other to form a single "tunnel"-shaped deformable connecting element between the two coaches of the vehicle and, preferably, the bands 110 are sewn together.

The stiffening frames 120 have the dual purpose of protecting the stitching between the bands 110 and stiffening the tunnel structure.

The present invention is preferably applied to the outer gangway bellows covers 101 and specifically to the end edges 101a of the outer gangway bellows cover.

With reference to FIGS. 2 to 6, the numeral 200 denotes a portion of the chassis of one of the two coaches of the vehicle, and in particular said portion 200 of the chassis may comprise a front end of the chassis or an element applied to the chassis.

According to the accompanying drawings, the portion 200 of the chassis comprises a rigid support 300 having a main direction of extension and having a first and a second inner wall 310, 320 opposite each other and connected by a respective end wall 330.

The rigid support 300 preferably has a prismatic shape with square or rectangular cross-section and is hollow inside, forming a compartment 400 extending in the main direction of extension of the rigid support 300.

Figure 2:
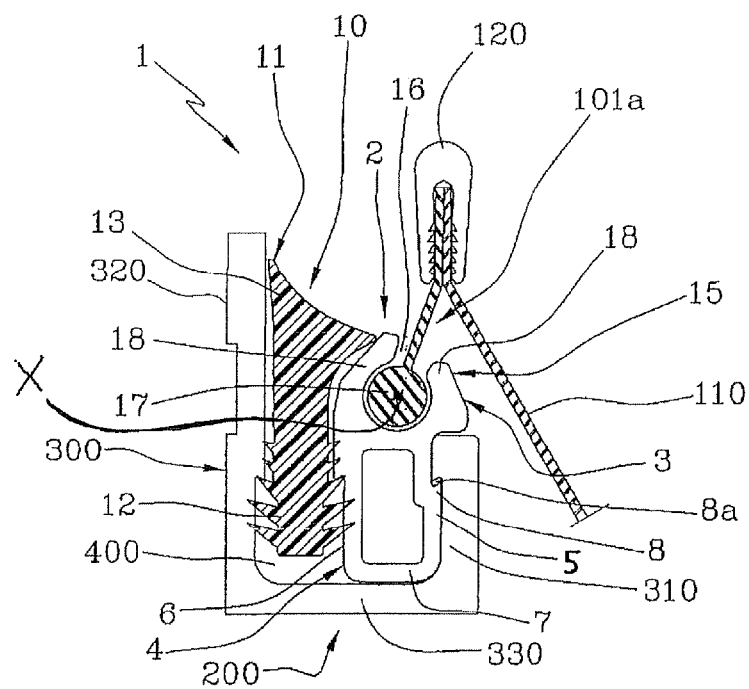
FIG. 2 is a plan view of a chassis—gangway bellows cover joint comprising a connecting device according to the present invention.
Figure 3:
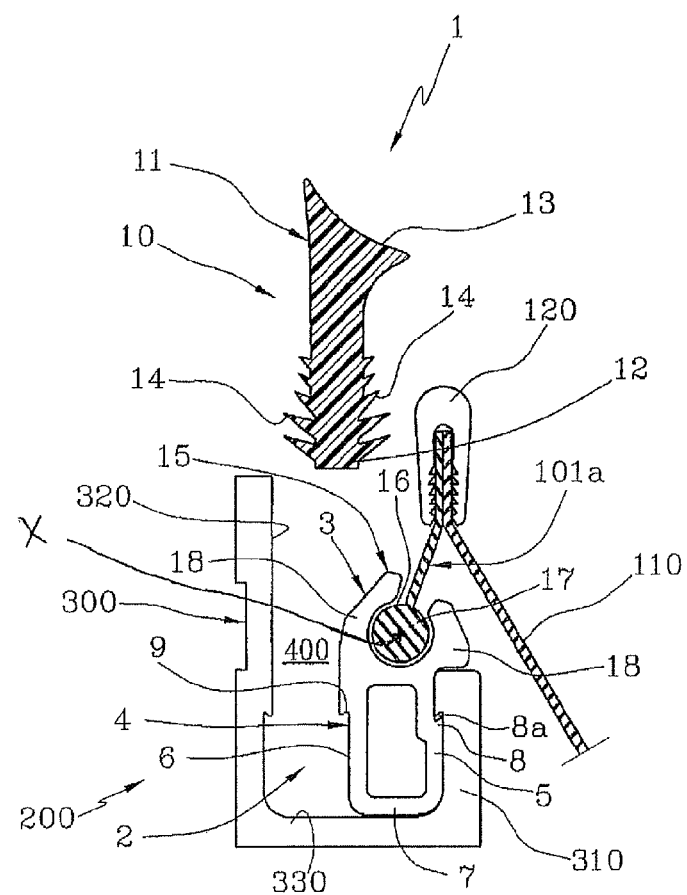
FIG. 3 is a plan view of the joint of FIG. 2 in a respective assembly step.

FIGS. 2 and 3 show a first embodiment of a connecting device 1, according to the present invention, for making the connection between the chassis of the coaches of the articulated vehicle and the gangway bellows cover 100.

The connecting device 1 comprises a connecting element 2 having a hooking portion 3 which can be stably connected to the end edge 101a of the outer gangway bellows cover 101, and an engagement portion 4 made in one piece with the hooking portion 3 and which may be inserted in the compartment 400.

Advantageously, the connecting element 2 is made of metal material such as steel or aluminum and has a main direction of extension parallel with the main direction of extension of the groove 400.

The engagement portion 4 has a prismatic shape with substantially rectangular cross-section so that it can easily be inserted in the groove 400, and has a first and a second contact surface, respectively labeled 5 and 6, opposite each other and a lower surface 7 abutted to the end wall 330.

The first surface 5 is abutted to the first inner wall 310 of the compartment 400 and has at least a first undercut 8 for hooking with a recess 8a made in the first wall 5.

The second surface 6 is opposite the second inner wall 320 and distanced from it. Moreover, the second surface 6 has a second undercut 9 for hooking with an insertion element 10.

In particular, the insertion element 10 is made of elastically deformable material, advantageously rubber, and is positioned in the compartment 400 between the connecting element 2 and the second wall 320 to stably engage the engagement portion 4 against the first wall 310.

As shown in the accompanying drawings, the insertion element 10 consists of a seal 11 which is substantially wedge-shaped in cross-section and forms an insertion end 12 positioned in the compartment 400, and a closing end 13 opposite the insertion end 12 and projecting outside the compartment 400.

Extending from the insertion end 12 there is a plurality of projecting portions 14, consisting of a set of deformable elastic segments which are spaced out. It should be noticed that, in the element 10 inserted condition (FIG. 2), the projecting portions 14 can be deformed against the second inner wall 320 and against the second surface 6 of the engagement portion 4. In this way, the portions 14 apply a pushing action on the connecting element 2, holding it against the first wall 310.

The closing end 13 has a greater cross-section than the insertion end 12 so that it engages with the second inner wall 320 and the hooking portion 3 to close the compartment 4 with a fluidproof seal. In other words, in the element 10 inserted condition (FIG. 2), the shape of the closing end 13 guarantees total closing of the compartment 400, keeping the compartment 400 closed with a fluidproof seal and preventing any infiltration by water.

The hooking portion 3 comprises a receiving portion 15 fixed to the engagement portion 4 and forming a cavity 16 for housing an end bulge 17 of the end edge 101a.

In detail, the receiving portion 15 has two retaining portions 18 which are opposite each other and separate at a gap zone in which the end edge 101a extends.

In this situation, it should be noticed that the closing end 13 of the seal 11 is abutted to one of the retaining portions 18 to push it towards the other retaining portion 18. As a result, the retaining portions 18 are moved towards each other, constraining the end bulge 17 positioned in the cavity 16.

It should also be noticed that the receiving portion 15 may advantageously comprise an indentation 19 (more clearly illustrated in FIG. 4) made in the cavity 16 and able to engage on the outer surface of the end edge 101a to connect it to the connecting element 2.

Moreover, the end bulge 17 of the end edge 101a is made so that it forms a single piece with the outer gangway bellows cover 101. In this way, the bulge 17 forms an end portion of the gangway bellows cover 101, having a cross-section much greater than the cross-section of the end edge 101a.

In accordance with the first embodiment illustrated in FIGS. 2 and 3, the end bulge 17 has a substantially cylindrical shape with a circular cross-section, and it can be rotatably inserted in the cavity 16 to guide the rotation of the gangway bellows cover 101 about a respective longitudinal axis X.

In this situation, the cavity 16 has a cylindrical shape with a circular cross-section extending about the axis X. The receiving portion 15 gap zone, formed by the distance between the retaining portions 18, forms an angle within which the entire end edge 101a can rotate.

Figure 4:
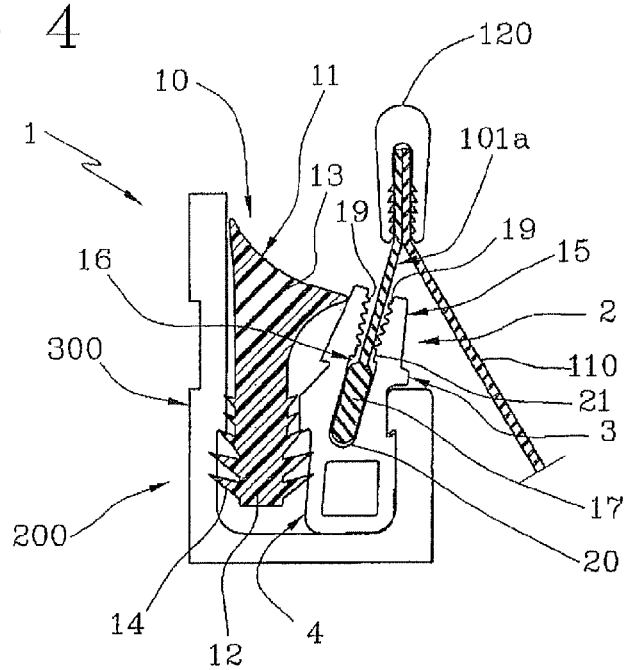
FIG. 4 is a plan view of a chassis—gangway bellows cover joint comprising a connecting device according to a second embodiment.

According to the second embodiment, illustrated in FIG. 4, it should be noticed that the end bulge 17 has a substantially extended shape, whilst the cavity 16 is a slot.

In particular, the cavity 16 consists of an end portion 20 with a substantially rectangular cross-section, in which the bulge 17 is housed, and an upper portion 21 on which the indentation 19 is made.

In this situation, the indentation 19 is anchored to the end edge 101a of the gangway bellows cover 101 to prevent the bulge 17 from moving away from the end portion 20.

According to another embodiment, illustrated in FIGS. 5 and 6, there is also an auxiliary insertion element 500, which can be inserted in the compartment 400 for stable connection to the rigid support 300.

In particular, the auxiliary insertion element 500 preferably comprises a screw 510, equipped with a threaded pin 511 and an upper head 512 which substantially has the shape of a truncated cone.

The screw 510 can be connected in an opening 600 made in a hollow portion 610 made in the end wall 330 and preferably projecting towards the outside of the rigid support 300. It should also be noticed that the opening 600 is in a lateral position in the end wall 330, near to the engagement portion 4, so that it is not blocked by the engagement portion 4.

The opening 600 has a threaded inner surface, allowing the pin 511 to be screwed into the hollow portion 610.

As shown in FIG. 5, the screw 510 is inserted in the compartment 400 so that it can be screwed into the opening 600 before the insertion element 10 is inserted. In this situation, a flared surface 513 of the screw 510 forming the conical shape of the head 512 is connected to respective angled surfaces 320*a*, 6*a* made on the second inner wall 320 and on the second surface 6 of the engagement portion 4.

In particular, it should be noticed that the angled surface 320*a* of the second inner wall 320 extends inside the compartment 400 at a respective lower zone close to the end wall 330. The angled surface 6*a* of the second surface 6 is made in a lateral protuberance 6*b* extending from the engagement portion 4.

In this way, when the screw 510 is screwed into the opening 600, the flared surface 513 is connected to the angled surfaces 320*a*, 6*a* which are opposite each other, thus holding the engagement portion 4 abutted to the first inner wall 310.

In other words, the action of the screw 510 on the angled surface 6*a* of the engagement portion 4 holds the engagement portion 4 anchored to the rigid support 300, pushing it towards the first inner wall 310 and towards the end wall 330.

Once the screw 510 has been screwed into the opening 600, the insertion element 10 is inserted in the compartment 400 as described above with reference to the embodiments shown in FIGS. 2, 3 and 4.

The present invention achieves the preset aims, overcoming the disadvantages of the prior art.

The shape of the connecting element 2, made of metal, and in particular the presence of the insertion element 10, guarantees a stable connection between the gangway bellows cover 101 and the chassis 300.

The metal structure of the connecting element and the presence of the indentation 19 guarantee an improved connection which is much more resistant to wear and fatigue.

Moreover, the rubber insertion element 10 allows the connecting element to be kept hooked to the vehicle chassis, also providing a fluidproof seal for the compartment.

This means that the whole device 1 is more reliable and longer lasting.

What is claimed is:

1. A device for connecting a gangway bellows cover and a chassis of an articulated vehicle, comprising:
    a compartment formed by a rigid support of the vehicle chassis;
    a connecting element having a hooking portion which can be connected to an end edge of a gangway bellows cover, and an engagement portion which can be inserted in the compartment and abutted to at least a first inner wall of the compartment;
    an elastically deformable insertion element made of rubber and positioned in the compartment between the connecting element and a second inner wall of the compartment, so as to stably engage the engagement portion against the first inner wall;
    wherein the connecting element is made of a metal material;
    wherein the engagement portion comprises: a first surface for contact with the first wall having at least a first undercut for hooking with a recess made in the first wall; and a second surface for contact with the insertion element, having a second undercut for hooking with at least one projecting portion of the insertion element.

2. The device according to claim 1, wherein the insertion element comprises a seal which is substantially wedge-shaped in cross-section and which has a plurality of projecting portions which can be deformed against the second inner wall of the compartment opposite the first wall, and against the second surface of the engagement portion to push the connecting element against the first wall.

3. The device according to claim 2, wherein the seal comprises an insertion end from which the projecting portions extend, and a closing end opposite the insertion end and abutted to the second inner wall and to the hooking portion to close the compartment with a fluid-proof seal; the cross-section of the closing end being greater than the insertion end.

4. The device according to claim 3, wherein the hooking portion comprises: an end bulge in the end edge, made so that it forms a single piece with the gangway bellows cover; and a receiving portion fixed to the engagement portion and forming a cavity housing the end bulge.

5. The device according to claim 4, wherein the receiving portion has two retaining portions which are opposite each other and separate at a gap zone in which the end edge extends; the closing end of the seal being abutted to one of the retaining portions to push it towards the other retaining portion thus constraining the end bulge in the cavity.

6. The device according to claim 4, wherein the receiving portion comprises an indentation made in the cavity and engaged on the outer surface of the end edge.

7. The device according to claim 6, wherein the cavity has a slot forming an end portion with a substantially rectangular cross-section, and an upper portion on which the indentation is made; said end bulge having a substantially extended shape and being constrained in the end portion of the slot; the indentation being anchored to the end edge of the gangway bellows cover.

8. The device according to claim 4, wherein the cavity has a cylindrical shape with a circular cross-section extending about an axis of rotation; the end bulge having a substantially cylindrical shape and being rotatably inserted in the cavity to guide the rotation of the gangway bellows cover about the axis of rotation.

9. The device according to claim 1, wherein it also comprises an auxiliary insertion element housed in the compartment and engaged between the rigid support and the connecting element for anchoring the connecting element against the first inner wall and against an end wall of the rigid support.

10. The device according to claim 9, wherein the auxiliary insertion element comprises a screw which can engage in an opening made in the end wall; the screw comprising an upper head connected to the second inner wall and to the engagement portion so as to push the engagement portion against the first inner wall and against the end wall.

11. A device for connecting a gangway bellows cover and a chassis of an articulated vehicle, comprising:
    a connecting element having a hooking portion which can be connected to an end edge of a gangway bellows cover, and an engagement portion which can be inserted in a compartment formed by a rigid support of the vehicle chassis and abutted to at least a first inner wall of the compartment,
    an elastically deformable insertion element positioned in the compartment between the connecting element and a second inner wall of the compartment, so as to stably engage the engagement portion against the first inner wall; and
    wherein the engagement portion comprises: a first surface for contact with the first wall having at least a first undercut for hooking with a recess made in the first wall;

and a second surface for contact with the insertion element, having a second undercut for hooking with at least one projecting portion of the insertion element.

12. The device according to claim 11, wherein the insertion element comprises a seal which is substantially wedge-shaped in cross-section and which has a plurality of projecting portions which can be deformed against the second inner wall of the compartment opposite the first wall, and against the second surface of the engagement portion to push the connecting element against the first wall.

13. The device according to claim 12, wherein the seal comprises an insertion end from which the projecting portions extend, and a closing end opposite the insertion end and abutted to the second inner wall and to the hooking portion to close the compartment with a fluid-proof seal; the cross-section of the closing end being greater than the insertion end.

14. The device according to claim 13, wherein the hooking portion comprises: an end bulge in the end edge, made so that it forms a single piece with the gangway bellows cover; and a receiving portion fixed to the engagement portion and forming a cavity housing the end bulge.

15. The device according to claim 14, wherein the receiving portion has two retaining portions which are opposite each other and separate at a gap zone in which the end edge extends; the closing end of the seal being abutted to one of the retaining portions to push it towards the other retaining portion thus constraining the end bulge in the cavity.

16. The device according to claim 14, wherein the receiving portion comprises an indentation made in the cavity and engaged on the outer surface of the end edge.

17. The device according to claim 14, wherein the cavity has a cylindrical shape with a circular cross-section extending about an axis of rotation; the end bulge having a substantially cylindrical shape and being rotatably inserted in the cavity to guide the rotation of the gangway bellows cover about the axis of rotation.

18. A device for connecting a gangway bellows cover and a chassis of an articulated vehicle, comprising:
a compartment formed by a rigid support of the vehicle chassis;
a connecting element having a hooking portion which can be connected to an end edge of a gangway bellows cover, and an engagement portion which can be inserted in a compartment formed by a rigid support of the vehicle chassis and abutted to at least a first inner wall of the compartment;
an elastically deformable insertion element positioned in the compartment between the connecting element and a second inner wall of the compartment, so as to stably engage the engagement portion against the first inner wall; and
an auxiliary insertion element housed in the compartment and engaged between the rigid support and the connecting element for anchoring the connecting element against the first inner wall and against an end wall of the rigid support.

19. The device according to claim 18, wherein the auxiliary insertion element comprises a screw which can engage in an opening made in the end wall; the screw comprising an upper head connected to the second inner wall and to the engagement portion so as to push the engagement portion against the first inner wall and against the end wall.

* * * * *